US012662359B2

(12) United States Patent
Karkheck et al.

(10) Patent No.: US 12,662,359 B2
(45) Date of Patent: Jun. 23, 2026

(54) DEVICES AND METHODS FOR LOADING AN ASSEMBLED SOLAR TABLE ONTO A MOBILE TRANSPORT

(71) Applicant: Terabase Energy, Inc., Berkeley, CA (US)

(72) Inventors: Johann Fritz Karkheck, Petaluma, CA (US); Sarika Kumar, Corvallis, OR (US); Adam Hansel, Davis, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 629 days.

(21) Appl. No.: 17/979,911

(22) Filed: Nov. 3, 2022

(65) Prior Publication Data

US 2024/0150160 A1 May 9, 2024

(51) Int. Cl.
| | |
|---|---|
| *B66F 9/18* | (2006.01) |
| *B65G 67/04* | (2006.01) |
| *B66F 9/075* | (2006.01) |
| *B66F 9/24* | (2006.01) |

(52) U.S. Cl.
CPC ............ *B66F 9/0755* (2013.01); *B65G 67/04* (2013.01); *B66F 9/07572* (2013.01); *B66F 9/18* (2013.01); *B66F 9/24* (2013.01)

(58) Field of Classification Search
None
See application file for complete search history.

(56) References Cited

U.S. PATENT DOCUMENTS

| | | | |
|---|---|---|---|
| 4,042,004 A | 8/1977 | Kwan | |
| 7,012,188 B2 | 3/2006 | Erling | |
| 7,105,940 B2 | 9/2006 | Weesner et al. | |
| 8,584,338 B2 | 11/2013 | Potter | |
| 8,650,812 B2 | 2/2014 | Cusson | |
| 9,827,678 B1 | 11/2017 | Gilbertson et al. | |
| 10,232,505 B2 | 3/2019 | Tadayon | |
| 10,414,318 B2 | 9/2019 | Valtanen | |
| 10,696,451 B2 | 6/2020 | Britcher et al. | |
| 10,801,755 B1 * | 10/2020 | Nemat ................... | F24S 25/634 |
| 11,228,275 B2 | 1/2022 | Miller et al. | |
| 11,241,799 B2 | 2/2022 | Clemenzi et al. | |
| 11,245,353 B2 | 2/2022 | Di Stefano et al. | |
| 11,502,638 B2 | 11/2022 | Watson et al. | |

(Continued)

FOREIGN PATENT DOCUMENTS

| | | |
|---|---|---|
| CN | 103324204 B | 11/2012 |
| CN | 104102227 B | 7/2017 |

(Continued)

OTHER PUBLICATIONS

Extended European search report mailed Feb. 21, 2025 in related European patent application No. 22850167.2, (11 pgs).

(Continued)

*Primary Examiner* — Mark C Hageman
(74) *Attorney, Agent, or Firm* — Michael North

(57) ABSTRACT

A solar table loader is described that moves an assembled solar table from an assembly frame to a mobile transport. The solar table loader comprises at least one motor that provides horizontal, vertical, and rotational movements of the solar table to facilitate onboarding of the solar table to the mobile transport.

17 Claims, 10 Drawing Sheets

(56) References Cited

U.S. PATENT DOCUMENTS

| | | | |
|---|---|---|---|
| 11,770,099 B2* | 9/2023 | Carter | B25J 5/007 |
| | | | 414/495 |
| 11,999,284 B2 | 6/2024 | Campbell et al. | |
| 2006/0201987 A1 | 9/2006 | Brown | |
| 2008/0260500 A1 | 10/2008 | Meulen | |
| 2010/0000592 A1 | 1/2010 | Ko | |
| 2010/0279455 A1 | 11/2010 | Seemann | |
| 2011/0284709 A1 | 11/2011 | Potter | |
| 2012/0027550 A1* | 2/2012 | Bellacicco | B60P 3/14 |
| | | | 414/547 |
| 2012/0085387 A1 | 4/2012 | French, Sr. | |
| 2012/0085395 A1 | 4/2012 | Kuster et al. | |
| 2012/0279069 A1 | 11/2012 | Von Deylen | |
| 2013/0133172 A1 | 5/2013 | Kiener et al. | |
| 2013/0153007 A1 | 6/2013 | Plesniak | |
| 2013/0340807 A1 | 12/2013 | Gerwing et al. | |
| 2014/0025343 A1 | 1/2014 | Gregg et al. | |
| 2014/0143061 A1 | 5/2014 | Abhyanker | |
| 2014/0246549 A1 | 9/2014 | West et al. | |
| 2015/0059827 A1 | 3/2015 | Reed et al. | |
| 2015/0066442 A1 | 3/2015 | Pryor | |
| 2015/0069001 A1 | 3/2015 | French et al. | |
| 2015/0075880 A1 | 3/2015 | Grossen et al. | |
| 2015/0210519 A1 | 7/2015 | Koyama | |
| 2016/0014283 A1 | 1/2016 | Nakano et al. | |
| 2016/0129595 A1 | 5/2016 | Gerio et al. | |
| 2016/0140283 A1 | 5/2016 | Morse et al. | |
| 2016/0285412 A1 | 9/2016 | French | |
| 2017/0137238 A1 | 5/2017 | Kamata | |
| 2019/0280641 A1 | 9/2019 | Owen | |
| 2019/0280647 A1 | 9/2019 | Novotny et al. | |
| 2019/0341878 A1 | 11/2019 | Watson et al. | |
| 2019/0367014 A1 | 12/2019 | Woodley | |
| 2020/0076358 A1 | 3/2020 | Au | |
| 2020/0350850 A1 | 11/2020 | Di Stefano et al. | |
| 2021/0041145 A1 | 2/2021 | Dally | |
| 2021/0205997 A1 | 7/2021 | Zhou et al. | |
| 2021/0206003 A1 | 7/2021 | Zhou et al. | |
| 2021/0234504 A1 | 7/2021 | Meller et al. | |
| 2021/0293455 A1 | 9/2021 | Au | |
| 2021/0379757 A1* | 12/2021 | Schneider | G05D 1/0293 |
| 2022/0034426 A1 | 2/2022 | Clapper et al. | |
| 2022/0103122 A1 | 3/2022 | Carter | |
| 2022/0234516 A1 | 7/2022 | Prentice et al. | |
| 2022/0411245 A1* | 12/2022 | Bailey | B66F 9/087 |
| 2023/0066547 A1 | 3/2023 | Campbell et al. | |
| 2023/0163720 A1 | 5/2023 | Di Stefano et al. | |
| 2024/0001836 A1 | 1/2024 | Di Stefano et al. | |
| 2024/0128920 A1 | 4/2024 | de Fresart et al. | |
| 2024/0140292 A1 | 5/2024 | Schuknecht et al. | |
| 2024/0258968 A1 | 8/2024 | Morin et al. | |
| 2024/0270146 A1 | 8/2024 | Campbell et al. | |
| 2024/0278704 A1 | 8/2024 | Campbell et al. | |
| 2024/0283388 A1 | 8/2024 | de Fresart et al. | |
| 2025/0128930 A1 | 4/2025 | Hansel et al. | |
| 2025/0221084 A1 | 7/2025 | Daly et al. | |
| 2025/0226791 A1 | 7/2025 | Smith et al. | |

FOREIGN PATENT DOCUMENTS

| | | | |
|---|---|---|---|
| CN | 209707983 U | 11/2019 | |
| CN | 219535977 U | 8/2023 | |
| DE | 102010038054 A1 | 3/2012 | |
| EP | 2263964 A2 | 12/2010 | |
| GB | 734098 | 7/1955 | |
| GB | 734098 A1 | 7/1955 | |
| KR | 101019430 B1 | 9/2008 | |
| KR | 20110031053 A | 9/2009 | |
| KR | 20210003486 A | 1/2021 | |
| WO | 2010145844 A2 | 12/2010 | |
| WO | 2011117485 A1 | 9/2011 | |
| WO | 2011128085 A2 | 10/2011 | |
| WO | 2013064624 A1 | 5/2013 | |
| WO | 2014060415 A1 | 4/2014 | |
| WO | 2014108196 A1 | 7/2014 | |
| WO | WO 2015190901 A1 | 12/2015 | |
| WO | WO 2018138033 A1 | 8/2018 | |
| WO | WO 2021119733 A1 | 6/2021 | |
| WO | 2021229387 A2 | 11/2021 | |
| WO | WO 2022112921 A1 | 6/2022 | |
| WO | WO 2023079377 A1 | 5/2023 | |

OTHER PUBLICATIONS

Notice of Allowance mailed Mar. 12, 2025 in related U.S. Appl. No. 18/616,152, (13 pgs).

Non-Final office action mailed Mar. 18, 2025 in related U.S. Appl. No. 18/616,154, (13 pgs).

Response to Non-Final office action filed Apr. 27, 2025 in related U.S. Appl. No. 18/616,154, (10 pgs).

Extended European search report mailed Apr. 22, 2025 in related European patent application No. 22865583.3, (10 pgs).

Australian examination report No. 2 mailed Apr. 28, 2025 in related Australian patent application No. 2022318755, (5 pgs).

Response to Australian examination report filed Apr. 4, 2025 in related Australian patent application No. 2022340639, (34 pgs).

Non-Final office action mailed Apr. 25, 2025 in related U.S. Appl. No. 17/390,159, (39 pgs).

Restriction requirement mailed Jul. 31, 2023 in related U.S. Appl. No. 18/084,987, (7 pgs).

Response to restriction requirement filed Sep. 28, 2023 in related U.S. Appl. No. 18/084,987, (8 pgs).

Restriction requirement mailed Sep. 22, 2023 in related U.S. Appl. No. 17/390,159, (7 pgs).

International search report and written opinion of the international searching authority mailed Dec. 16, 2022 in related PCT application No. PCT/US22/38288, (11 pgs).

International Search Report and Written Opinion of the International Searching Authority mailed Dec. 13, 2022 in related PCT application No. PCT/US22/42396, (9 pgs).

International Search Report and Written Opinion of the International Searching Authority mailed May 1, 2023 in related PCT application No. PCT/US23/11125, (9 pgs).

International Search Report and Written Opinion of the International Searching Authority mailed Sep. 14, 2024 in related PCT application No. PCT/US2024/35487, (11 pgs).

Australian examination report mailed Feb. 5, 2025 in related Australian patent application No. 2022318755, (5 pgs).

Non-final office action mailed Feb. 11, 2025 in related U.S. Appl. No. 17/581,873, (20 pgs).

Australian examination report mailed Feb. 11, 2025 in related Australian patent application No. 2022340639, (4 pgs).

Non-Final office action mailed Mar. 26, 2024 in related U.S. Appl. No. 17/581,873, (38 pgs).

Notice of Allowance mailed Mar. 7, 2024 in related U.S. Appl. No. 17/464,178, (12 pgs).

Non-Final office action response filed May 15, 2024 in related U.S. Appl. No. 17/390,159, (12 pgs).

Response to office action filed Jun. 26, 2024 in related U.S. Appl. No. 17/581,873, (10 pgs).

Final office action mailed Sep. 18, 2024 in related U.S. Appl. No. 17/390,159, (34 pgs).

Final office action mailed Oct. 29, 2024 in related U.S. Appl. No. 17/581,873, (19 pgs).

Response to Advisory Action filed Jan. 29, 2025 in related U.S. Appl. No. 17/581,873, (17 pgs).

Non-Final office action mailed Nov. 15, 2024 in related U.S. Appl. No. 18/616,154, (17 pgs).

Response to Non-Final office action filed Dec. 1, 2024 in related U.S. Appl. No. 18/616,154, (7 pgs).

Notice of allowance mailed Dec. 20, 2024 in related U.S. Appl. No. 18/616,154, (5 pgs).

Non-Final office action mailed Nov. 18, 2024 in related U.S. Appl. No. 18/616,152, (13 pgs).

Response to Non-Final office action filed Nov. 27, 2024 in related U.S. Appl. No. 18/616,152, (7 pgs).

(56)                    References Cited

OTHER PUBLICATIONS

Notice of allowance mailed Dec. 26, 2024 in related U.S. Appl. No. 18/616,152, (8 pgs).

Response to final office action filed Nov. 16, 2024 in related U.S. Appl. No. 17/390,159, (14 pgs).

Advisory action mailed Dec. 27, 2024 in related U.S. Appl. No. 17/390,159, (6 pgs).

Response to advisory action filed Jan. 29, 2025 in related U.S. Appl. No. 17/390,159, (16 pgs).

International search report and written opinion of the international searching authority mailed Nov. 20, 2023 in related PCT application No. PCT/US2023/029584, (7 pgs).

Response to Restriction requirement filed Nov. 21, 2023 in related U.S. Appl. No. 17/390,159, (7 pgs).

Non-final office action mailed Dec. 20, 2023 in related U.S. Appl. No. 17/464,178, (23 pgs).

International search report and written opinion of the international searching authority mailed Dec. 21, 2023 in related PCT application No. PCT/US2023/029583, (14 pgs).

Non-final office action mailed Jan. 18, 2024 in related U.S. Appl. No. 17/390,159, (33 pgs).

Notice of allowance mailed Nov. 14, 2023 in related U.S. Appl. No. 18/084,987, (21 pgs).

Examination Report mailed Sep. 8, 2025 in related Australian patent application No. 2022318755, (5 pgs).

Response to examination report filed Nov. 17, 2025 in related Australian patent application No. 2022318755, (2 pgs).

Response to the Extended European Search Report (EESR) filed Sep. 22, 2025, in related European patent application No. 22865583.3, (13 pgs).

Final office action response filed Oct. 1, 2025, in related U.S. Appl. No. 17/581,873, (10 pgs).

Advisory action mailedOct. 20, 2025, in related U.S. Appl. No. 17/581,873, (3 pgs).

Advisory action response filedNov. 5, 2025, in related U.S. Appl. No. 17/581,873, (11 pgs).

Non-final office action mailed Nov. 14, 2025, in related U.S. Appl. No. 17/581,873, (18 pgs).

Response to Extended European Search Report filed Sep. 8, 2025, in related European patent application No. 22850167.2, (13 pgs).

Non-final office action mailed Oct. 6, 2025, in related U.S. Appl. No. 18/214,245, (58 pgs).

Spanish Search report mailed Oct. 6, 2025, in related Spanish patent application No. 202590019, (9 pgs).

Response to examination report filed Oct. 24, 2025, in related Australian patent application No. 2023209790, (11pgs).

Australian examination report mailed Jun. 3, 2025 in related Australian patent application No. 2023209790, (4 pgs).

Australian Notice of Allowance mailed Jun. 12, 2025 in related Australian patent application No. 2022340639, (4 pgs).

Non-final office action mailed Jun. 20, 2025 in related U.S. Appl. No. 18/616,152, (14 pgs).

Saudi Arabian examination report mailed Jun. 29, 2025 in related Saudi Arabian patent application No. SA 1120244048, (4 pgs).

Notice of Allowance mailed Jul. 8, 2025 in related U.S. Appl. No. 18/616,154, (8 pgs).

Response to non-final office action filed Jul. 25, 2025 in related U.S. Appl. No. 17/390,159, (13 pgs).

Saudi Arabian examination report mailed Jul. 13, 2025 in related Saudi Arabian patent application No. SA 1120240965, (4 pgs).

Final office action mailed Aug. 5, 2025 in related U.S. Appl. No. 17/581,873, (28 pgs).

Australian office action response filed Aug. 11, 2025 in related Australian patent application No. 2022318755, (6 pgs).

Notice of grant mailed Oct. 9, 2025 in related Australian patent application No. 2022340639, (1 pg).

Notice of allowance mailed Nov. 3, 2025 in related U.S. Appl. No. 18/616,152, (9 pgs).

Non-final office action mailed Nov. 26, 2025 in related U.S. Appl. No. 18/370,862, (32 pgs).

Final office action mailed Oct. 2, 2025 in related U.S. Appl. No. 17/390,159, (32 pgs).

Final office action response filed Nov. 24, 2025 in related U.S. Appl. No. 17/390,159, (15 pgs).

Non-final office action response filed Feb. 26, 2026 in related U.S. Appl. No. 18/370,862, (9 pgs).

Examination Report No. 4 dated Dec. 11, 2025 in related Australian Patent Application 2022318755, (6 pgs).

Response to examination report No. 4 filed Jan. 13, 2026 in related Australian Patent Application 2022318755, (10 pgs).

Joseph H. Cain et al., "Wind Loads on Utility Scale Solar PV Power Plants", 2015 Seaoc Convention Proceedings, available from the Internet, <URL:chrome-extension://efaidnbmnnnibpcajpcglclefindmkaj/https://cppwind.com/wp-content/uploads/2020/12/Wind-Loads-on-Utility-Scale-Solar-PV-Power-Plants_DBanks_2015.pdf> (8 pgs).

Examination Report No. 2 dated Dec. 11, 2025 in related Australian Patent Application 2023209790, (4 pgs).

Extended European Search Report dated Dec. 18, 2025 in related European Patent Application 23743710.8, (10 pgs).

Office action mailed Dec. 23, 2025 in related Brazilian Patent Application No. BR112024014367-8, (6 pgs).

Response to Non-final office action filed Jan. 6, 2026 in related U.S. Appl. No. 18/214,245, (12 pgs).

Advisory Action mailed Dec. 29, 2025 in related U.S. Appl. No. 17/390,159, (4 pgs).

Response to Spanish search report filed Dec. 31, 2025 in related Spanish Patent Application No. P202590019, (74 pgs).

Examination Report No. 5 dated Feb. 3, 2026 in related Australian Patent Application 2022318755, (5 pgs).

Non-final office action response filed Feb. 9, 2026 in related U.S. Appl. No. 17/581,873, (11 pgs).

Notice of allowance mailed Feb. 25, 2026 in related U.S. Appl. No. 18/214,245, (16 pgs).

Appeal brief filed Mar. 2, 2026 in related U.S. Appl. No. 17/390,159, (20 pgs).

Final office action mailed Apr. 9, 2026 in related U.S. Appl. No. 18/370,862, (25 pgs).

Saudi Arabia examination report mailed Mar. 2, 2026 in related application No. SA 1120240368, (10 pgs).

Saudi Arabia examination report mailed Mar. 9, 2026 in related application No. SA 1120240965, (6 pgs).

Brazilian examination report mailed Mar. 31, 2026 in related application No. BR 112024003911-0, (6 pgs).

Spanish examination report mailed Apr. 1, 2026 in related application No. 202590019, (6 pgs).

Australian examination report mailed Apr. 9, 2026 in related application No. 2023372777, (4 pgs).

Response to Australian examination report filed Mar. 26, 2026 in related application No. 2023209790, (12 pgs).

Australian examination report No. 1 mailed Apr. 30, 2026 in related Australian patent application No. 2023412924, (4 pgs).

Notice of Allowance mailed May 19, 2026 in related Australian patent application No. 2023209790, (4 pgs).

* cited by examiner

DEVICES AND METHODS FOR LOADING AN ASSEMBLED SOLAR TABLE ONTO A MOBILE TRANSPORT

STATEMENT REGARDING FEDERALLY SPONSORED RESEARCH OR DEVELOPMENT

This invention was made with government support under DE-EE0009012 awarded by the U.S. Department of Energy. The government has certain rights in the invention.

TECHNICAL FIELD

The present disclosure relates generally to a solar table loader that transitions an assembled solar table from an assembly frame to a mobile transport for delivery to an installation site within a large solar panel system. More particularly, the present disclosure relates to a motorized solar table loader that provides horizontal, vertical and rotational movements of an assembled solar table to facilitate the movement of the solar table from an assembly frame to a mobile transport.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move components, such as assembled solar tables, around the site during the construction process.

Large-scale solar panel systems typically include thousands of solar panels that are located across multi-acre terrain and that are electrically coupled to provide a source of energy. These large-scale systems are oftentimes located in remote areas and require a significant investment in materials, resources and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials being delivered to a deployment site via an access road. The materials are then processed and staged at the deployment site by a crew. A small portion of this delivered material is then moved by heavy equipment to a specific location where a solar table and mounting equipment are assembled and installed at that location 102. The step is then repeated for an adjacent location 103 where materials are subsequently delivered, assembled and installed for a neighboring solar table within the system. While this approach may be effectively deployed in the installation of smaller solar systems, it becomes cost prohibitive as the size of the system increases.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

FIGURE ("FIG.") 1 shows a prior art assembly and installation process of large-scale solar panel systems.

DETAILED DESCRIPTION OF EMBODIMENTS

Figure 1:
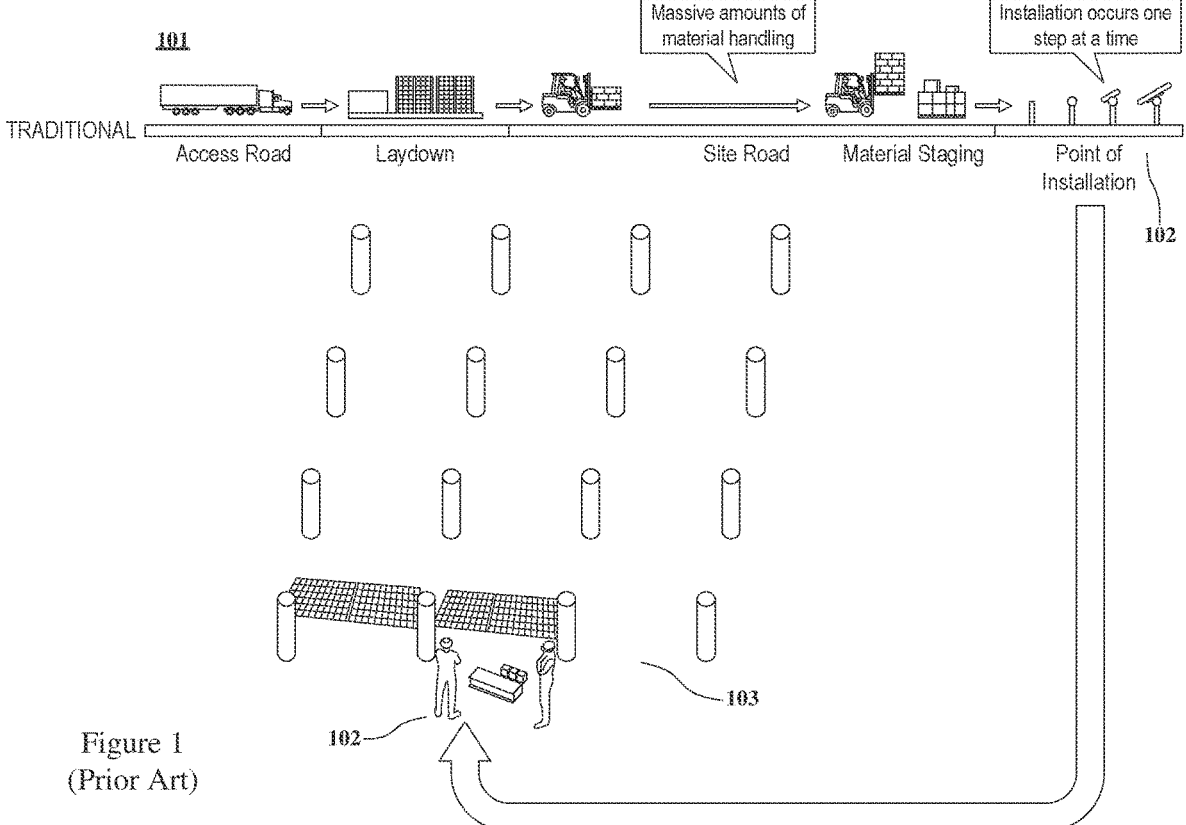

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including various processes, apparatuses, systems, devices, or methods.

Components, devices and systems shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of a solar table loader.

Furthermore, structures and functions associated with components or systems within the figures are not intended to be limited to those specifically illustrated and/or described. Rather, these components may be modified, re-formatted, or otherwise changed in a variety of ways consistent with the understanding of one of skill in the art. Also, components may be integrated together or be discrete within the context of a solar panel loader.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar table mobile transports; and (4) certain functions may be performed concurrently or in sequence.

Furthermore, it shall be noted that many embodiments described herein are given in the context of the assembly of a solar table and subsequent loading of the solar table onto a mobile transport for delivery to an installation site within a large-scale solar system, but one skilled in the art shall recognize that the teachings of the present disclosure may apply to other large and complex construction sites in which resources and personnel are difficult to manage, assembled at a centralized point and subsequently delivered to an installation site. Additionally, embodiments of a solar table loader may be implemented in smaller construction sites.

In this document, "large-scale solar system" refers to a solar system having 1000 or more solar panels. The word "resources" refers to material, parts, components, equipment or any other items used to construct a solar table and/or solar system. The word "personnel" refers to any laborer, worker, designer or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) solar panels and/or electrical harnesses. The term "solar panel loader" describes a structure that provides vertical, horizontal and rotational movement of a solar table to enable loading of the solar table onto a mobile transport. The term "solar table mobile transport" (hereinafter, "mobile transport") describes a vehicle used to move a solar table to an installation site and facilitate an installation process of the solar table. A mobile transport may be driven by personnel, controlled by remote control or move autonomously within at least a portion of a solar system construction site. The term "motor" is defined as a structural device that produces motion of a solar table, this motion may be unidirectional or multidirectional, and a motor may provide movement in horizontal, vertical, rotational or a combination thereof. Examples of some motors may include elements such as actuators, tracks, etc. that help in producing motion of a solar table loader.

Figure 2:
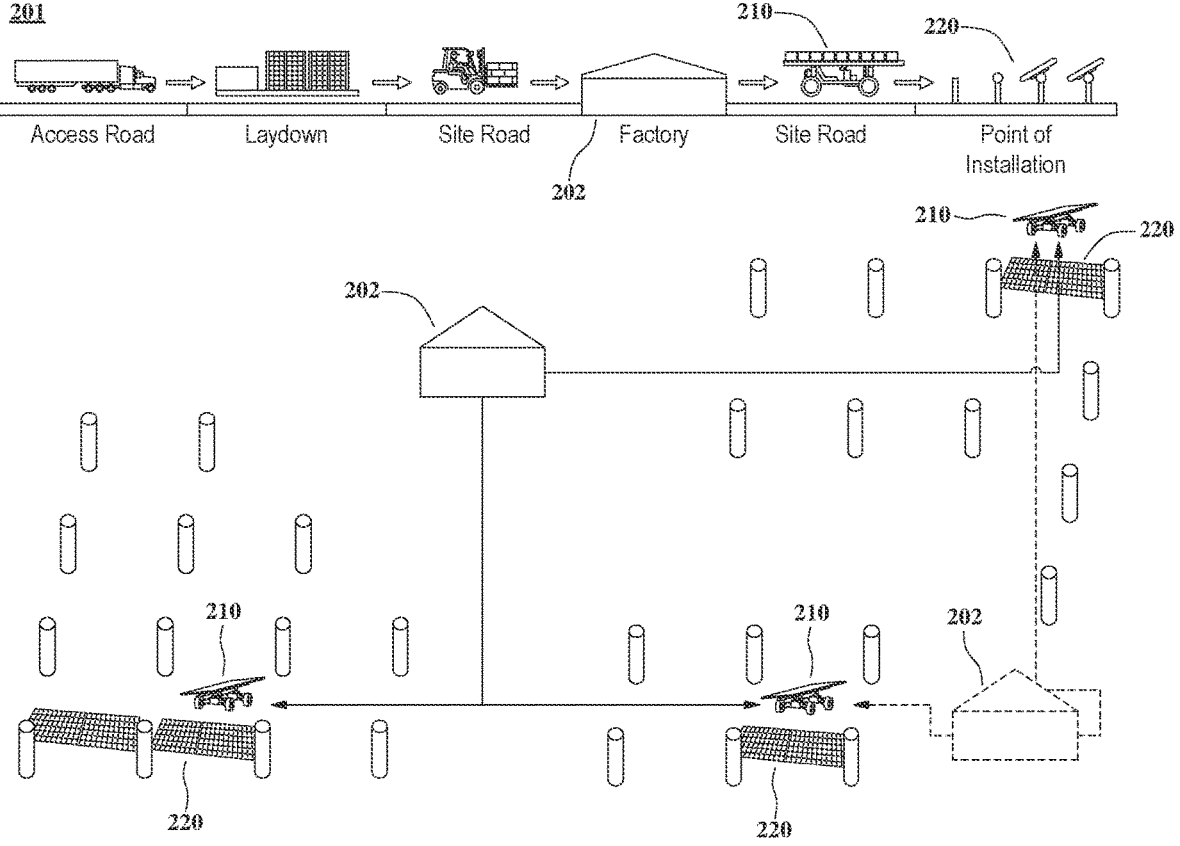
FIG. 2 is a diagram showing a centralized assembly and installation of a solar system including mobile transport of solar tables in accordance with various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates a solar panel loader that transitions an assembled solar table from a solar table assembly frame to a mobile transport vehicle to move the assembled solar table to an installation site. Additionally, the solar table loader may provide functionality to enable alignment of a torque tube on a solar table to securing points on the mobile transport during a process of moving the solar table from an assembly frame to the mobile transport.

As shown in this FIG. 2, resources are brought to a construction site 201 for a large-scale solar system and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from a factory 202 to an installation site 220 via motorized vehicles 210 such as a mobile transport. In certain embodiments, the factory 202 comprises an assembly frame on which a solar table is constructed and a solar panel loader that moves the assembled solar panel to a mobile transport for delivery to the installation site 220. The solar panel loader may be controlled by personnel, automated and controlled by a computing device and sensors, or a combination thereof.

Figure 3:
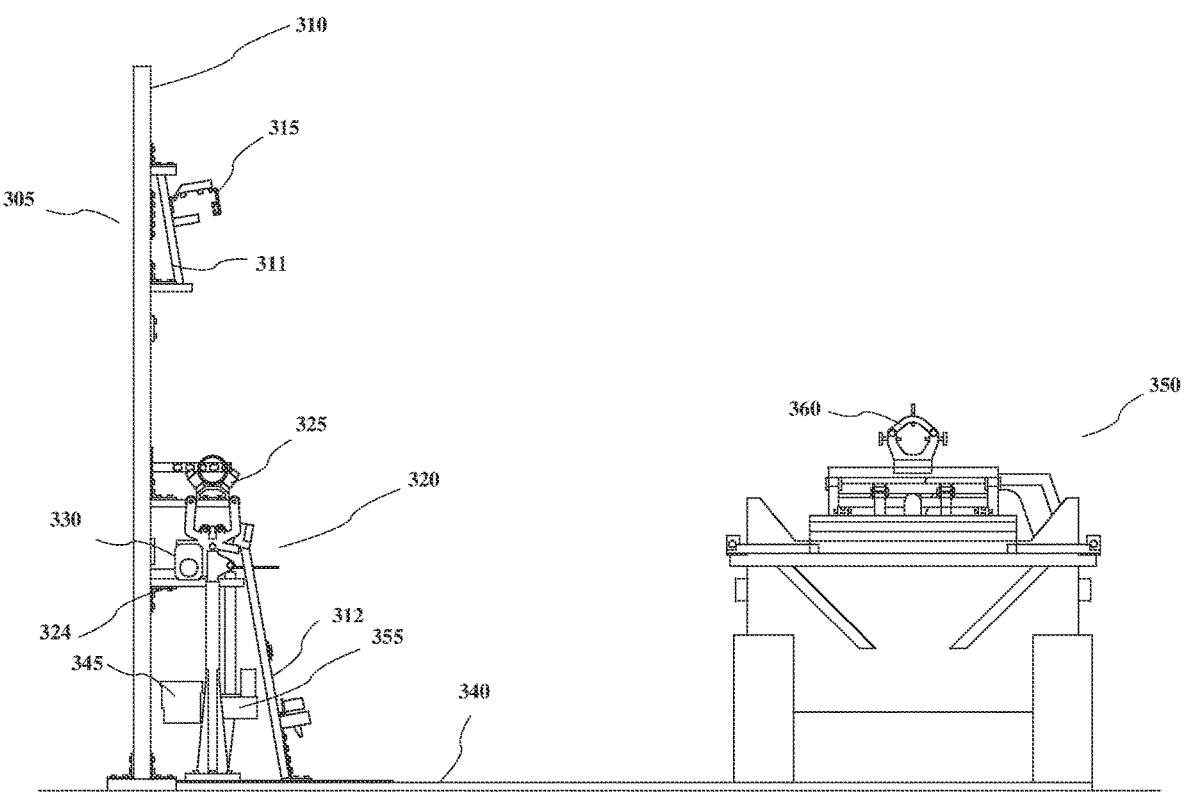
FIG. 3 is a first illustration of a solar table assembly location comprising a solar table assembly frame, a solar table loader and a mobile transport according to various embodiments of the invention.

FIG. 3 is a first illustration of a solar table assembly location comprising a solar table assembly frame, a solar table loader and a mobile transport according to various embodiments of the invention. As shown, an assembly frame 305 comprises a vertical support 310 that supports components within a solar table during an assembly. In certain embodiments, the assembly frame 305 comprises an upper support 311 and a lower support 312 that enable supported movement of solar panels in a semi-vertical position across the assembly frame 305. In various embodiments, the angle of solar panels may be positioned at an angle from the ground anywhere between 90 degrees to 180 degrees across the upper support 311 and lower support 312. In certain embodiments the upper support 311 and the lower support 312 may comprises rollers that allow personnel to slide solar panels into position within the assembly frame for subsequent bolting to a torque tube. In certain embodiments, the movement of solar panels within the assembly frame may also be performed by motor or a combination of automated and manual movement. The assembly frame 305 may also comprise an assembly frame locking mechanism 315 that secures a solar panel or a solar table to the frame 305. In one example, the assembly frame locking mechanism 315 is a curved locking arm that extends over a solar panel in a locked position and vertically extends away from the solar panel in an unlocked position. One skilled in the art will recognize that the assembly frame locking mechanism 315 may be provided in a variety of structures and perform locking functionality in a number of different ways. The assembly frame 305 may also contain a torque tube support 324 that secures a torque tube within the assembly frame 305. In various embodiments, a torque tube is secured within a torque tube support 324 and thereafter solar panels are positioned on the upper support 311 and lower support 312 to enable the solar panels to be bolted to the torque tube during an assembly process of a solar table.

A solar table loader 320 moves an assembled solar table from the assembly frame 305 to a mobile transport 350. The solar table loader 320 provides horizontal, vertical and rotational movements of an assembled solar table to facilitate securing the solar table to the mobile transport 350 in a preferred position. The solar table loader comprises a securing element that couples to the solar table such as a torque tube securing element that secures to and supports the torque tube. In certain embodiments, the torque tube securing element is a c-clamp 325 in which the torque tube resides. This c-clamp 325 may provide locking arms that are positioned around the torque tube to further support and prevent unwanted movement of the torque tube.

In various embodiments the solar table loader 320 comprises a first motor 345 that horizontally moves the assembled solar table between the assembly frame 305 and the mobile transport 350. In certain examples, a track 340 positioned on the ground surface that guides this horizontal movement. The ground surface may be any surface on the ground or on a surface coupled to the ground. The solar table loader 320 may also comprise a second motor 355 that moves the assembled solar table vertically. This vertical movement allows the solar table loader 320 to position the solar table above the mobile transport 350 and subsequently lower the solar table to a secure position. The solar table loader 320 may also comprise a third motor 330 that rotates the solar table around an axis. In certain embodiments, this rotation occurs around the torque tube within the solar table. This rotational movement allows the solar table loader to position the solar table at a preferred angle on the mobile transport 350 for subsequent delivery to an installation site. One skilled in the art will recognize that the first motor 345, the second motor 355 and the third motor 330 may be integrated together (or not) such that the solar table loader comprises one, two or three motors that provide the three different movements described above.

The mobile transport 350 comprises one or more solar table securing elements that secure the solar table to the mobile transport 350. In certain embodiments, the one or more solar table securing elements is a c-ring clamp that wraps around the torque tube and is tightened such that the torque tube is fastened to the mobile transport 350. One skilled in the art will recognize the manner in which the solar table transport 320 solves the problem of moving oftentimes large and heavy assembled solar tables between the assembly frame 305 and mobile transport 350 without needing a large group of personnel to manually lift and load the solar table onto the mobile transport 350.

Figure 4:
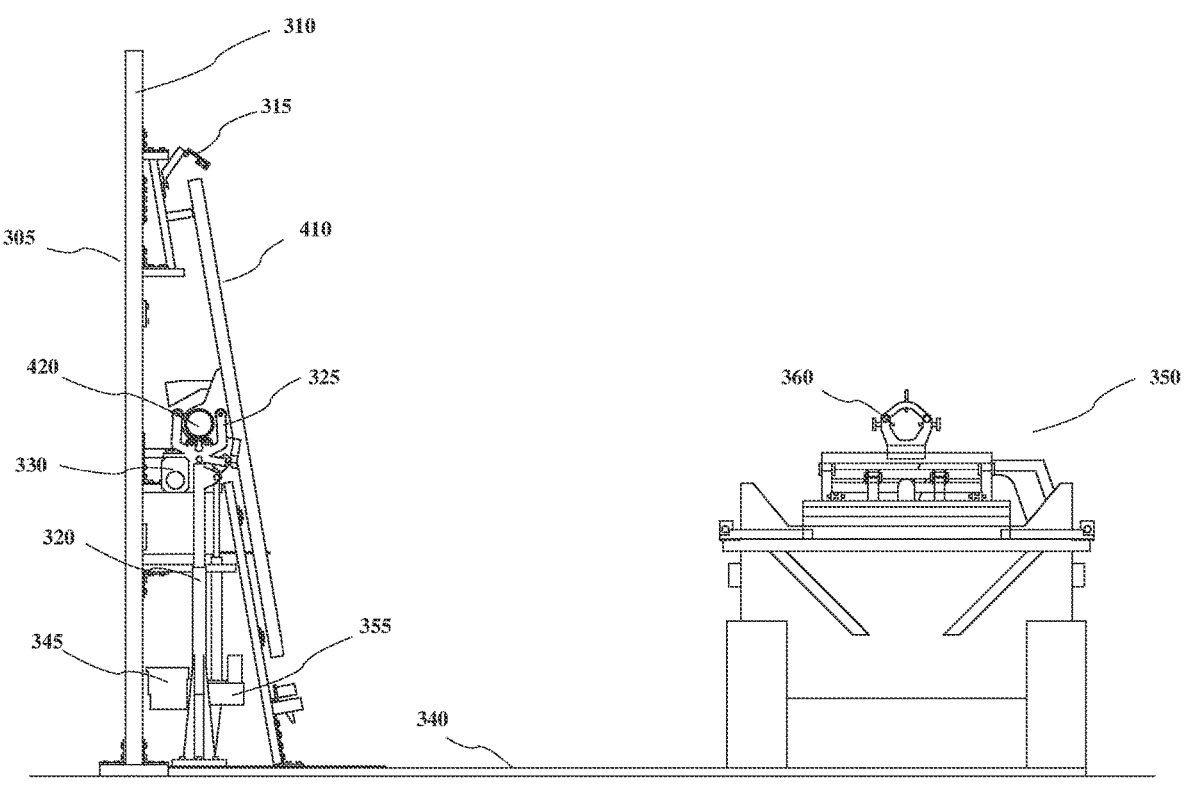
FIG. 4 is a second illustration of a solar table assembly location comprising a solar table assembly frame, a solar table loader and a mobile transport according to various embodiments of the invention.

FIGS. 4-7 illustrate an exemplary method for loading a solar table onto a mobile transport in accordance with various embodiments of the invention. As shown in FIG. 4, an assembled solar table is positioned on the assembly frame 305 wherein one or more solar panels 410 are secured to a torque tube 420. The assembly frame locking mechanism 315 is positioned in an unlock position which allows the solar table to be removed from the assembly frame 305. The majority of the solar table weight is supported by the solar table loader 320 by the torque tube 420 resting within torque tube securing element (e.g., the c-clamp 325). As a result, the assembled solar table may be removed from the assemble frame 305.

Figure 5:
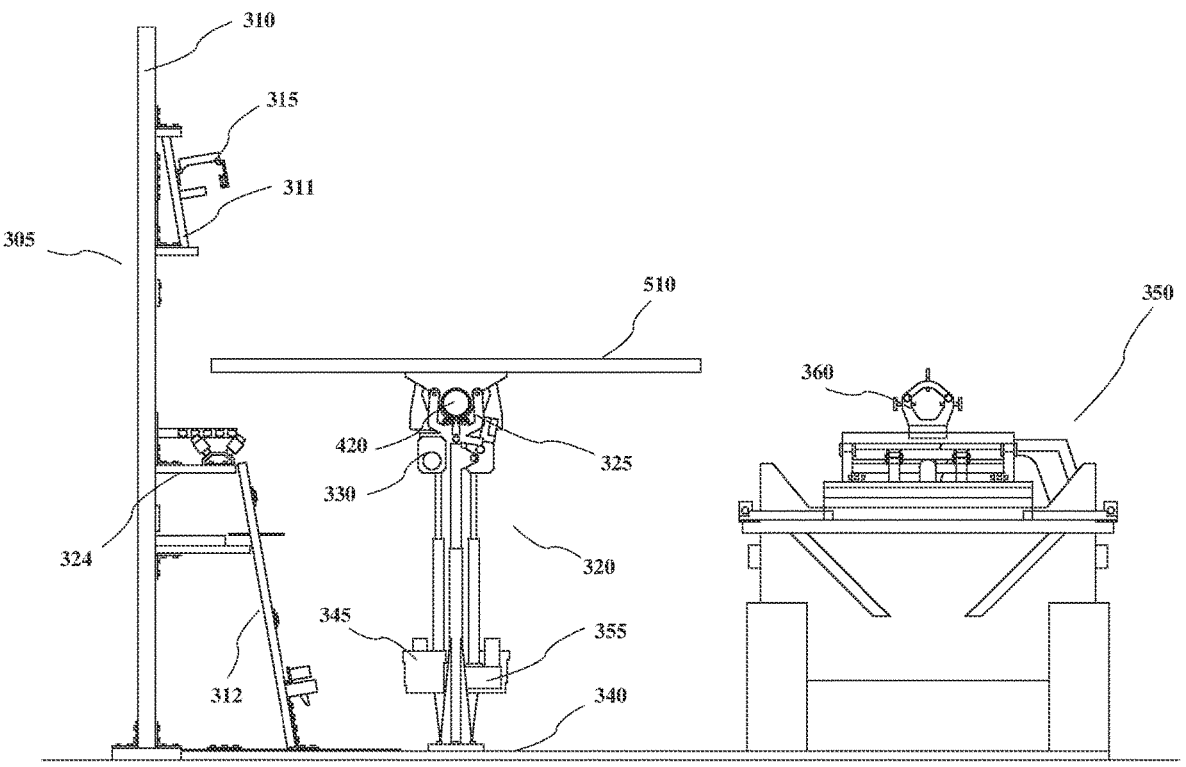
FIG. 5 is a third illustration of a solar table assembly location comprising a solar table assembly frame, a solar table loader and a mobile transport according to various embodiments of the invention.

FIG. 5 illustrates a next stage of the solar panel loading process according to various embodiments of the invention. As shown, the solar panel loader 320 has moved the assembled solar table 510 horizontally along the tracks 340 away from the assembly frame 305. Also, the solar table loader 320 has rotated the solar table 510 so that it is parallel to the ground. This rotational movement allows the solar table loader 320 to position in a preferred position(s) during the onboarding process. One skilled in the art will recognize that the rotated position of the solar table 510 may vary across different embodiments of the invention. In this particular embodiment, the solar table loader 320 comprises two upright portions (only one is visible in this figure) with a large opening between the two upright portions. This large opening is sufficiently wide to allow one of the upright portions to be positioned in front of the mobile transport 350 and the second upright portion to be positioned behind the mobile transport 350 as shown in FIG. 6.

Figure 6:
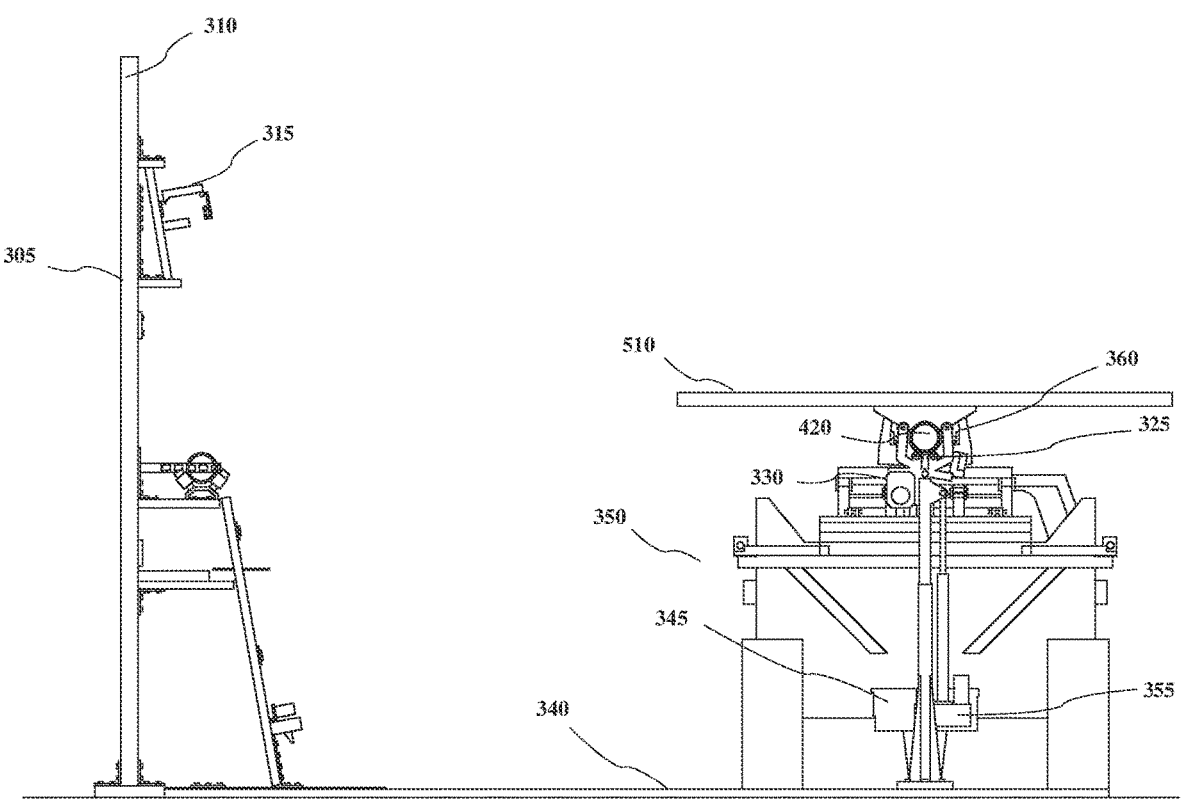
FIG. 6 is a fourth exemplary illustration of a solar table assembly location comprising a solar table assembly frame, a solar table loader and a mobile transport according to various embodiments of the invention.

FIG. 6 illustrates a further stage of the solar panel loading process according to various embodiments of the invention. As shown, the solar table loader 320 has moved horizontally such that it is straddling the mobile transport 350 with the solar table 510 positioned above the transport. The solar table loader 320 provides vertical movement of the solar table 510 such that it may be positioned above the mobile transport 350 at different heights to enable onboarding of the solar table 510 on different types and sizes of transport vehicles. The combination of horizontal, vertical and rotational movements of the solar table 510 while secured to the solar table loader enables dynamic onboarding that may be controlled by personnel, automated systems comprising sensors and processing elements, or a combination thereof. In addition, this three-way movement allows a solar table to be secured to the mobile transport 350 using a variety of different securing elements that may attach to the solar table at one or more different locations.

In certain embodiments, the solar table 510 may be secured to the mobile transport 350 via a torque tube securing element, such as the c-clamp 325, that wraps around the torque tube 420. In this particular example, the solar table loader 320 positions the torque tube 420 above the c-clamp 325 on the mobile transport. Once the torque tube 420 is sufficiently aligned to the c-clamp 325, the solar table loader 320 lowers the solar table 410 until the torque tube 420 rests within an opening of the c-clamp 325. This vertical movement continues downward until the solar table weight is supported entirely by the mobile transport 350. Thereafter, the solar table loader 320 may be moved away to enable a final securing process that results in the solar table 510 being sufficiently secured to the mobile transport 350 so that it may be delivered at a remote location at an installation site.

One skilled in the art will recognize that the process of aligning a solar table on a solar table loader to securing elements, such as a torque tube securing element, on a mobile transport may be performed manually by personnel, may be an automated process, or a combination thereof.

Figure 7:
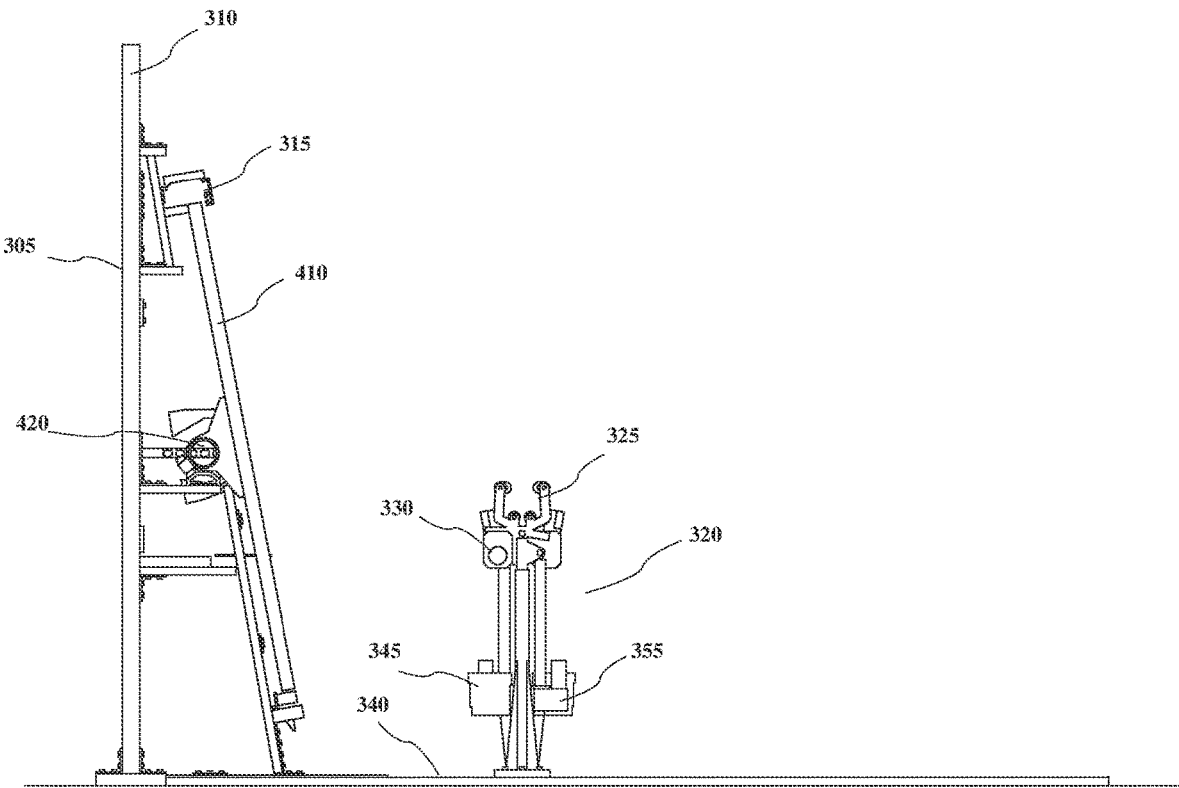
FIG. 7 is a fifth illustration of a solar table assembly location comprising a solar table assembly frame, a solar table loader and a mobile transport according to various embodiments of the invention.
Figure 8:
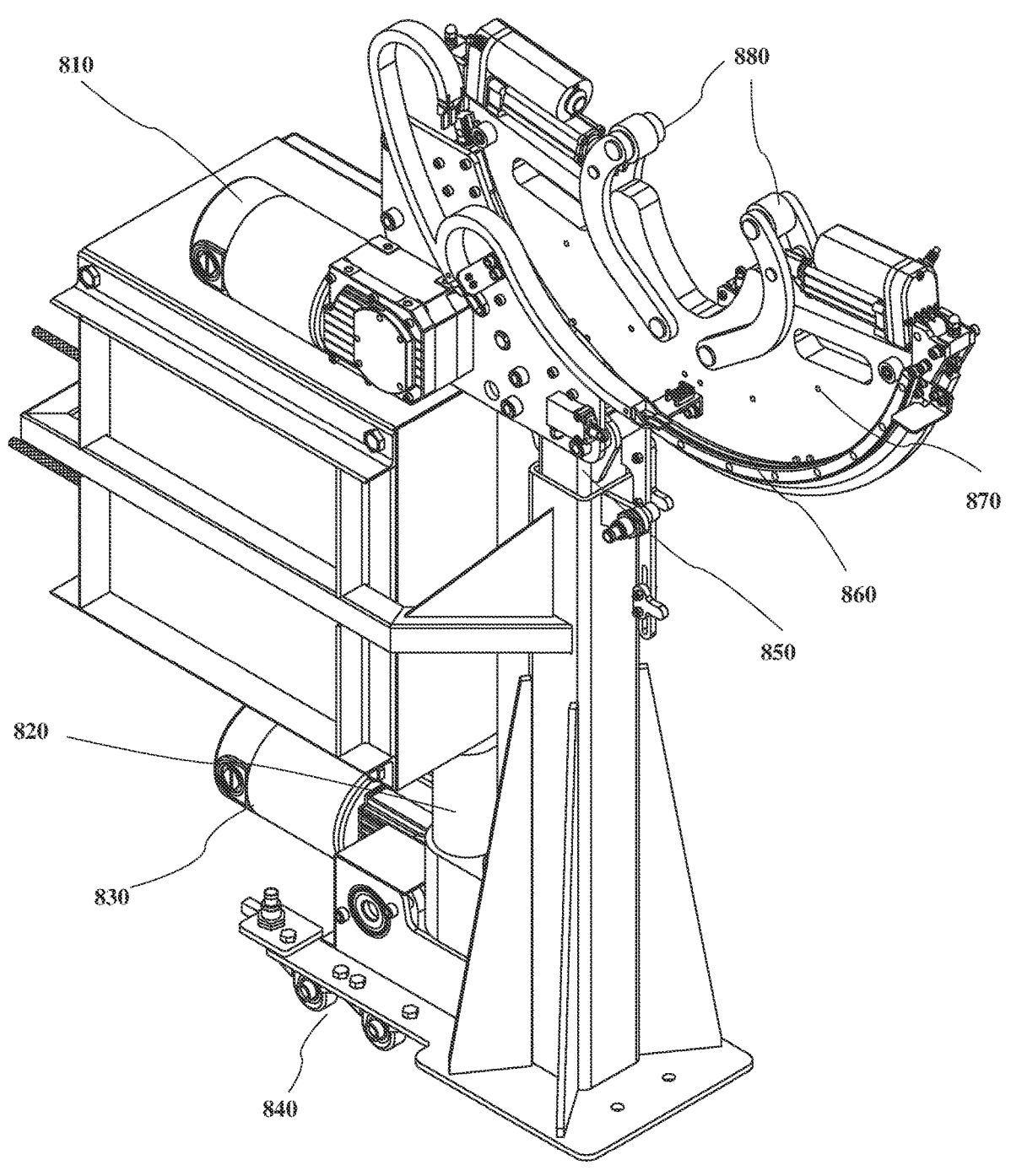
FIG. 8 is a first side of a solar table loader according to various embodiments of the invention.

FIG. 7 illustrates a final step of the solar panel loading process according to various embodiments of the invention. As described above, the solar table loader 320 places the solar table onto the mobile transport 350 using a combination of horizontal, vertical and rotational movement. In this embodiment, the solar table torque tube is aligned to and vertically lowered into a torque tube securing element. Thereafter, the solar table loader 320 is moved horizontally away from the mobile transport 350 along the tracks 340 to provide sufficient space for the mobile transport 350 and solar table 510 to drive to an installation site within the large-scale solar system FIG. 8 illustrates a first upright portion of a solar table loader in accordance with various embodiments of the invention. As previously described, embodiments of the invention support a solar table loader in which two upright portions provide onboarding on a solar table. An opening between the upright portions allows the solar table loader to straddle a mobile transport and place a solar table above the mobile transport. One skilled in the art will recognize that this first upright portion is one example of many different implementations of the present invention.

The upright portion includes a first motor 830 that is coupled to wheels 840 that support horizontal movement of the solar table loader. The first motor 830 provides power to move the solar table loader horizontally between the assembly frame and the mobile transport. In certain embodiments, the wheels 840 may be positioned within a track that guides this horizontal movement between an assembly frame and a mobile transport. A second motor 820 provides vertical movement of the solar table loader. In certain embodiments, the second motor extends a rail 850 in an up and down motion. One aspect of this vertical motion is that it allows the solar table loader to extend an assembled solar table above the mobile transport for subsequent alignment to securing elements. A third motor 810 provides rotational movement of the solar table. In certain embodiments, this rotation occurs around an axis centered at or proximate to a torque tube of the solar table. The third motor 810 is coupled to provide power to a torque tube securing element 870 that holds the torque tube securely during this rotational movement. In this particular example, the torque tube securing element 870 is a c-clamp; however, one skilled in the art will recognize that a variety of structural implementations of the torque tube securing element 870 may be used to secure the solar table during horizontal, vertical and/or rotational movement.

In various embodiments, the torque tube securing element 870 rotates along a track 860 located proximate to an edge of the securing element. The torque tube securing element 870 may also have extendable angled arms that wrap or partially wrap around the torque tube. These features of a c-clamp embodiment of the torque tube securing element 870 will be described in more detail below.

Figure 9:
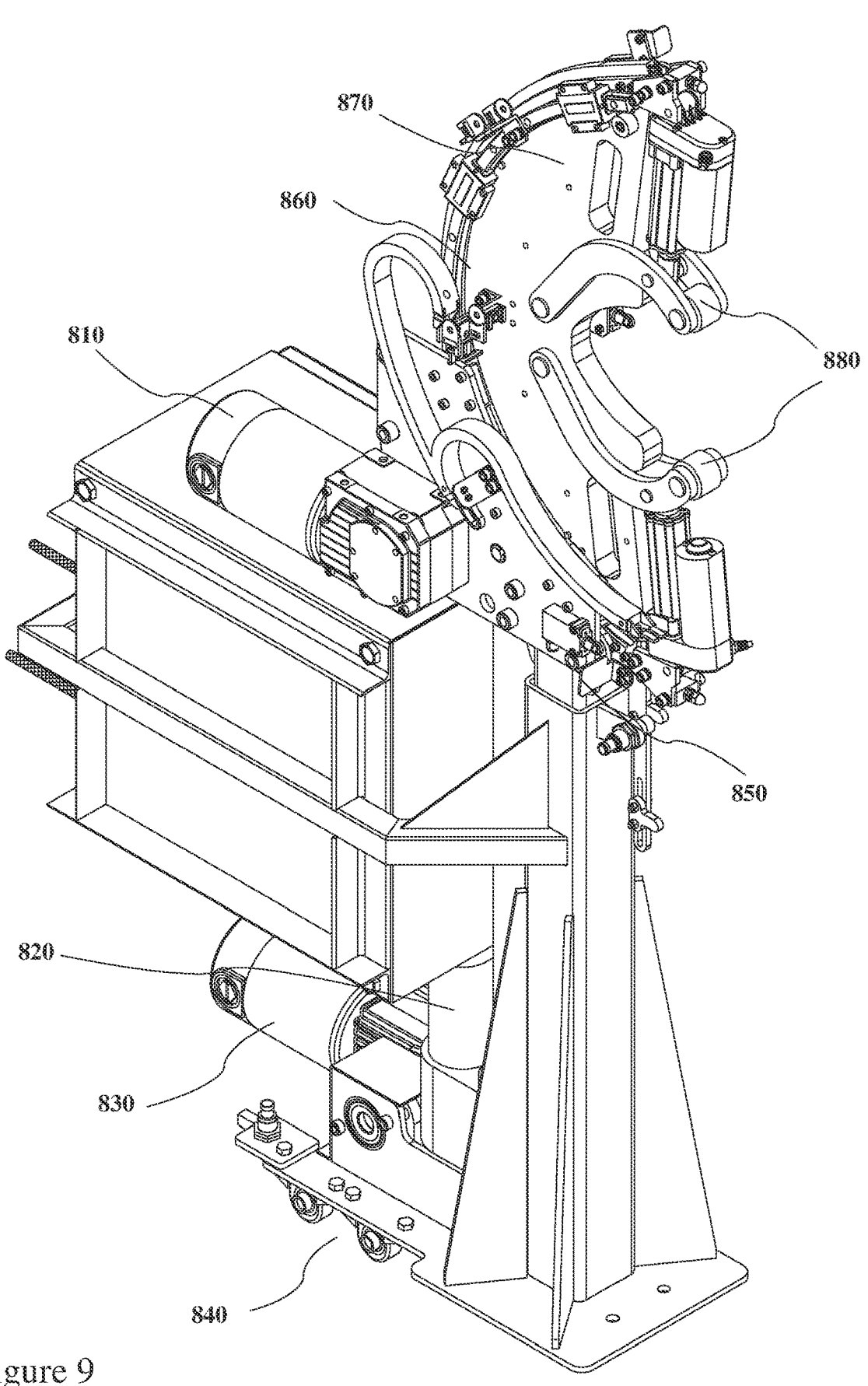
FIG. 9 is a second side of a solar table loader according to various embodiments of the invention.

FIGS. 8 and 9 illustrate rotational positions of the torque tube securing element 870 in accordance with various embodiments of the invention. As shown in FIG. 9, a solar table is positioned at a ninety-degree angle relative to ground while the solar table is positioned at one hundred and eighty degrees relative to ground as shown in FIG. 8. In various embodiments, the torque tube secure element 870 may rotate between ninety and one hundred and eight degrees and pause at any position therebetween.

Figure 10:
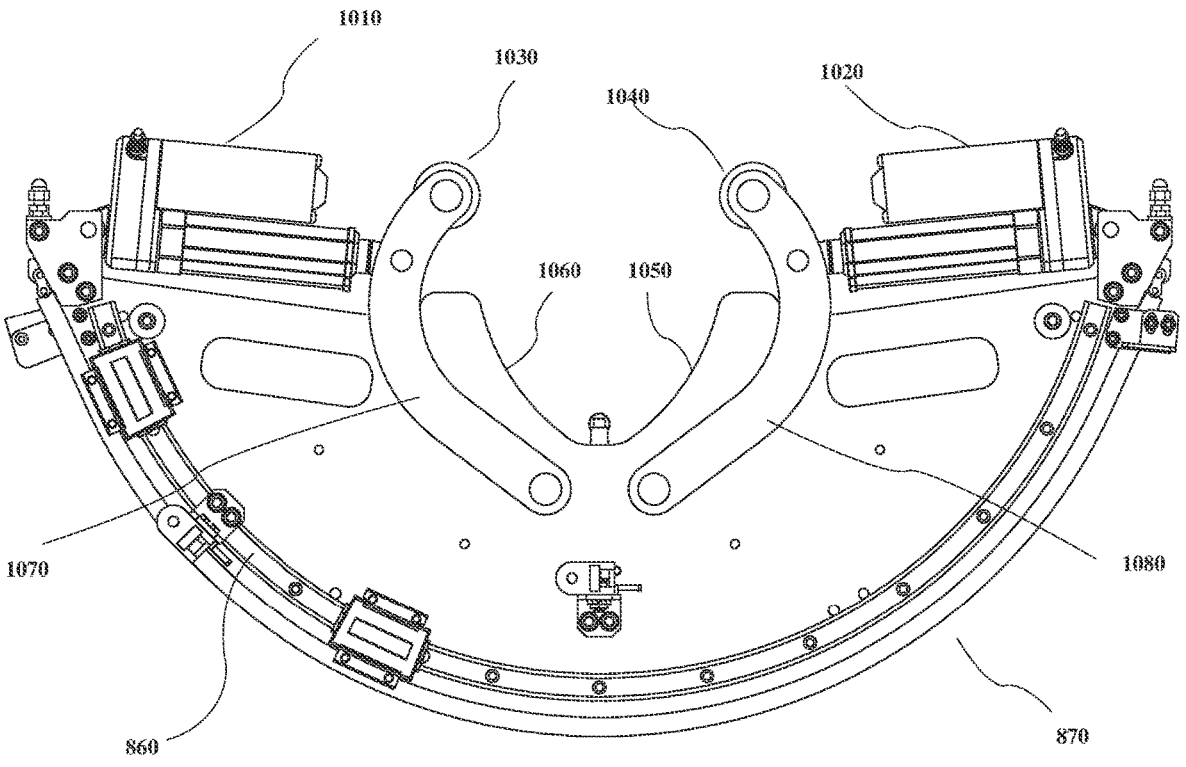
FIG. 10 is a side view of a torque tube securing element according to various embodiments of the invention.

FIG. 10 illustrates an exemplary torque tube securing element according to various embodiments of the invention. In this particular example, the torque tube securing element 870 is embodied as a c-clamp comprising a first cradle surface 1050 and a second cradle surface 1060 that supports a torque tube. The torque tube securing element 870 further a first curved arm 1070 and a second curved arm 1080 that lock the torque tube in place. The first curved arm 1070 comprises a first compression roller 1030 and the second curved arm 1080 comprises a second compression roller 1040. The curved arms 1070, 1080 and the compression rollers 1030, 1040 extend around the torque tube to secure it while being held by the solar table loader. One skilled in the art will recognize that a variety of structural elements may be provided that secure a torque tube and/or other component of a solar table to the solar table loader.

The torque tube securing element 870 also comprises a first actuator 1010 and a second actuator 1020 that retract the first and second curved arms 1070, 1080 and first and second compression rollers 1030, 1040 from the torque tube or extends the first and second curved arms 1070, 1080 and the first and second compression rollers 1030, 1040 around the torque tube. In certain embodiments, the curved arms 1070, 1080 and compression rollers 1030, 1040 apply a sufficient force to the torque tube to minimize movement of the torque tube during operation of the solar table loader. One skilled in the art will recognize that a variety of different motors, including actuators, may be used to move the compression rollers relative to a torque tube.

The torque tube securing element 870 also comprises a track system 860 that is coupled to a motor to provide rotational movement of the solar table. In this particular example, the rotational movement occurs around the torque tube that effectively functions as a rotational axis. The track system 860 and associated motor allows the solar panel loader to rotate and position the solar table anywhere between 90 degrees and 180 degrees relative to ground. This rotational control allows the solar table loader to position the angle of the solar table at different positions during the processes of (1) removing an assembled solar table from an assembly frame, (2) move the assembled solar table from the assembly frame, and (3) position the solar table relative to a mobile transport so that it can be secured thereon.

One skilled in the art will recognize that a solar table may have a variety of different support structures such as beams, purlins, etc., that either supplement or replace a torque tube. All of these different solar type examples are intended to fall within the scope of certain embodiments of the invention.

One skilled in the art will recognize that the different movements supported by the solar table loader enable robust alignment processes that allow for a more efficient and accurate alignment of a solar table to a corresponding mounting structure(s) on a mobile transport. In some embodiments, the alignment process(es) may be performed manually by personnel at the installation site that control each of the motors during alignment. In other embodiments, the alignment process(es) may be automatically performed by sensors and motor controls such that motor movement is controlled by computerized analysis of sensor data and/or image data. In yet other embodiments, the alignment process(es) may be performed by a combination of manual and automated steps. A variety of sensor technologies may be employed by a mobile transport such as LiDAR, camera sensors, radar sensors and other sensor technologies known to one of skill in the art. Furthermore, active and passive sensor systems may also be deployed.

In certain examples, detachable sensor systems may be positioned on a solar table (such as on a torque tube) prior to or during installation of the solar table. The detachable sensor device/system may be removed from the solar table once installation is complete and positioned on another table that needs to be installed within the system.

In other examples, the alignment process may comprise both manual and automated processes that result in the installation of a solar panel within the system. The solar table loader may also include verification devices that confirm a solar table has been properly secured within the solar table loader.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A solar table loader for loading a solar table on a mobile transport, the solar table loader comprising:
a securing element that couples to the solar table, the securing element is a torque tube securing element that couples to a torque tube within the solar table;
a first motor coupled within the solar table loader, the first motor providing horizontal movement of the solar table between an assembly frame for the solar table to the mobile transport;
a second motor coupled within the solar table loader, the second motor providing vertical movement of the solar table;
a third motor coupled within the solar table loader, the third motor providing rotational movement of the solar table; and
a track proximate to an edge of the torque tube securing element, the track guiding rotational movement of the torque tube securing element along the track in coordination with the third motor.

2. The solar table loader of claim 1 wherein the torque tube securing element comprises a c-clamp that at least partially wraps around the torque tube.

3. The solar table loader of claim 2 wherein the c-clamp comprises a first angled arm and a second angled arm, the first and second angled arms extend outward and wrap at least partially around the torque tube.

4. The solar table loader of claim 1 further comprising at least one pad proximate to at least one solar panel when the solar panel is positioned on the solar table loader.

5. The solar table loader of claim 1 wherein the first, second and third motors are discrete motors within the solar table loader.

6. The solar table loader of claim 1 further comprising a plurality of wheels located proximate to a bottom surface of the solar table loader, the plurality of wheels move along a track positioned on a ground surface between the assembly frame and the mobile transport.

7. The solar table loader of claim 1 wherein the second motor extends the solar table above the mobile transport to enable an onboarding process of the solar table to the mobile transport.

8. The solar table loader of claim 1 wherein at least one of the horizontal, vertical and rotational movement is controlled by a computing device and a plurality of sensors.

9. The solar table loader of claim 1 wherein at least one of the horizontal, vertical and rotational movement is controlled by personnel.

10. A solar table loader that loads a solar table onto a mobile transport, the solar table loader comprising:
a first upright portion comprising a first torque tube securing element that couples to a torque tube on the solar table, the first upright portion comprising a first plurality of motors that provide horizontal, vertical and rotational movement of the solar table;
a second upright portion comprising a second torque tube securing element that couples to the torque tube on the solar table, the second upright portion comprising a second plurality of motors that provide horizontal, vertical and rotational movement of the solar table; and
wherein the first and second upright portions are positioned to create an opening in which at least a portion of the mobile transport resides and to enable the solar table to be located above the mobile transport to facilitate securing the solar table to the mobile transport.

11. The solar table loader of claim 10 wherein the first upright portion moves horizontally along a first track and the second upright portion moves horizontally along a second track, the first and second tracks defines a path between an assembly frame and a mobile transport.

12. The solar table loader of claim 10 further wherein each of the first and second upright portions comprises a vertical rail that extends vertically to position the solar table above the mobile transport.

13. The solar table loader of claim 10 wherein the torque tube securing element rotates to position the solar table at an angle between 90 degrees and 180 degrees relative to ground.

14. The solar table loader of claim 13 wherein the torque tube securing element comprises a track proximate to a curved edge, the track guides rotation of the torque tube securing element.

15. The solar table loader of claim 13 wherein the torque tube securing element comprises a c-clamp in which the torque tube resides during movement of the solar table.

16. The solar table loader of claim 10 wherein at least one of the horizontal, vertical and rotational movements is automated using a computing device and a plurality of sensors.

17. The solar table loader of claim 10 wherein at least one of the horizontal, vertical and rotational movements is controlled by personnel.

* * * * *